US012462552B2

United States Patent
Willmott et al.

(10) Patent No.: US 12,462,552 B2
(45) Date of Patent: Nov. 4, 2025

(54) SYSTEM AND METHOD FOR PROMPT SEARCHING

(71) Applicants: Robert Bosch GmbH, Stuttgart (DE); Carnegie Mellon University, Pittsburgh, PA (US)

(72) Inventors: Devin T. Willmott, Pittsburgh, PA (US); Victor Abayomi Akinwande, Pittsburgh, PA (US); Yiding Jiang, Pittsburgh, PA (US); Dylan Jiang Sam, Pittsburgh, PA (US); Jeremy Kolter, Pittsburgh, PA (US)

(73) Assignees: Robert Bosch GmbH (DE); Carnegie Mellon University, Pittsburgh, PA (US)

( * ) Notice: Subject to any disclaimer, the term of this patent is extended or adjusted under 35 U.S.C. 154(b) by 326 days.

(21) Appl. No.: 18/217,248

(22) Filed: Jun. 30, 2023

(65) Prior Publication Data

US 2025/0005918 A1 Jan. 2, 2025

(51) Int. Cl.
*G06V 10/86* (2022.01)
*G06F 40/284* (2020.01)
(Continued)

(52) U.S. Cl.
CPC ............ *G06V 10/86* (2022.01); *G06F 40/284* (2020.01); *G06V 10/761* (2022.01);
(Continued)

(58) Field of Classification Search
CPC .... G06V 10/86; G06V 10/761; G06V 10/774; G06V 10/82; G06V 20/70; G06V 10/70;
(Continued)

(56) References Cited

U.S. PATENT DOCUMENTS 9,094,615 B2 * 7/2015 Aman ................... G06Q 30/02
2023/0122874 A1 * 4/2023 Gupta ................... G06F 18/24
707/723

FOREIGN PATENT DOCUMENTS

WO WO-2024158853 A1 * 8/2024 ............ G06N 3/084

OTHER PUBLICATIONS

Gintare Karolina Dziugaite et al., "Computing Nonvacuous Generalization Bounds for Deep (Stochastic) Neural Networks with Many More Parameters than Training Data", arXiv:1703.11008v2 [cs.LG] Oct. 19, 2017, 14 Pages.
(Continued)

*Primary Examiner* — Charlotte M Baker
(74) *Attorney, Agent, or Firm* — Dickinson Wright PLLC

(57) ABSTRACT

A computer-implemented method that includes receiving a plurality of input images, generating a visual matrix utilizing the plurality of images and an image encoder, wherein the visual matrix includes a list of encoded images, receiving a plurality of text prompts, selecting a text prompt from the plurality of text prompts, send the first one of the text prompts to a language model to generate a candidate list of tokens, selecting tokens, converting the text prompts into updated text prompts via appending the tokens, generating a text matrix utilizing the text prompt and text encoder, and utilizing numerical values assigned at an image-text similarity matrix, determining a score associated with the image-text similarity matrix; and evaluating a criteria and outputting a final token to the updated text prompt in response to identifying a highest score associated with the final token after evaluating each of the plurality of text prompts.

20 Claims, 9 Drawing Sheets

(51) Int. Cl.
  *G06V 10/74* (2022.01)
  *G06V 10/774* (2022.01)
  *G06V 10/82* (2022.01)
  *G06V 20/70* (2022.01)
(52) U.S. Cl.
  CPC ............ *G06V 10/774* (2022.01); *G06V 10/82* (2022.01); *G06V 20/70* (2022.01)
(58) Field of Classification Search
  CPC ..... G06V 10/764; G06F 40/284; G06F 40/20; G06F 18/213; G06F 18/2135; G06F 18/22; G06F 40/151; G06N 3/0895; G06N 3/09; G06N 3/0985
  USPC .......................................................... 382/157
  See application file for complete search history.

(56) References Cited

OTHER PUBLICATIONS

Alec Radford et al., "Learning Transferable Visual Models From Natural Language Supervision." arXiv:2103.00020v1 [cs.CV] Feb. 26, 2021, 48 Pages.
Alexey Dosovitskiy et al., "An Image is Worth 16X16 Words: Transformers for Image Recognition at Scale." arXiv:2010.11929v2 [cs.CV] Jun. 3, 2021, 22 Pages.
Behnam Neyshabur et al., "Norm-Based Capacity Control in Neural Networks." arXiv:1503.00036v2 [cs.LG] Apr. 14, 2015, 29 Pages.
Behnam Neyshabur et al., "In Search of the Real Inductive Bias: On the Role of Implicit Regularization in Deep Learning." arXiv:1412.6614v4 [cs.LG] Apr. 16, 2015, 9 Pages.
Behnam Neyshabur et al., "A Pac-Bayesian Approach to Spectrally-Normalized Margin Bounds for Neural Networks." arXiv:1707.09564v2 [cs.LG] Feb. 23, 2018, 9 Pages.
Behnam Neyshabur et al., "Exploring Generalization in Deep Learning." 31st Conference on Neural Information Processing Systems (NIPS 2017), Long Beach, CA, USA, 10 Pages.
Brian Lester et al., "The Power of Scale for Parameter-Efficient Prompt Tuning." Proceedings of the 2021 Conference on Empirical Methods in Natural Language Processing, pp. 3045-3059, Nov. 7-11, 2021, 15 Pages.
Chao Jia et al., "Scaling Up Visual and Vision-Language Representation Learning With Noisy Text Supervision." Proceedings of the 38 th International Conference on Machine Learning, PMLR 139, 2021, 13 Pages.
David A. McAllester, "PAC-Bayesian Model Averaging." COLT 1999, pp. 164-170.
Pengfei Liu et al., "Pre-train, Prompt, and Predict: A Systematic Survey of Prompting Methods in Natural Language Processing." arXiv:2107.13586v1 [cs.CL] Jul. 28, 2021, 46 Pages.
Gintare Karolina Dziugaite et al., "In Search of Robust Measures of Generalization." 34th Conference on Neural Information Processing Systems (NeurIPS 2020), Vancouver, Canada, 11 Pages.
Gintare Karolina Dziugaite et al., "On the role of data in PAC-Bayes bounds." Proceedings of the 24th International Conference on Artificial Intelligence and Statistics (AISTATS) 2021, San Diego, California, USA. PMLR: vol. 130, 11 Pages.
Gordon Christie et al., "Functional Map of the World." CVPR 2018, pp. 6172-6180.
Hemanth Venkateswara et al., "Deep Hashing Network for Unsupervised Domain Adaptation." CVPR 2017, pp. 5018-5027.
Hugo Touvron et al., "LLaMA: Open and Efficient Foundation Language Models." arXiv:2302.13971v1 [cs.CL] Feb. 27, 2023, 27 Pages.
Jared Kaplan et al., "Scaling Laws for Neural Language Models." arXiv:2001.08361v1 [cs.LG] Jan. 23, 2020, 30 Pages.
John Langford et al., "(Not) Bounding the True Error." Part of Advances in Neural Information Processing Systems 14 (NIPS 2001), 8 Pages.
Maria Perez-Ortiz et al., "Tighter Risk Certificates for Neural Networks." Journal of Machine Learning Research 22 (2021) 1-40 Submitted Aug. 2020; Revised May 2021; Published Aug. 2021, 40 Pages.
Paul Viallard et al., "A General Framework for the Disintegration of Pac-Bayesian Bounds." arXiv:2102.08649v2 [stat.ML] Oct. 11, 2021, 23 Pages.
Peter L. Bartlett et al., "Spectrally-normalized margin bounds for neural networks." arXiv:1706.08498v2 [cs.LG] Dec. 5, 2017, 24 Pages.
Sanae Lotfi et al., "PAC-Bayes Compression Bounds So Tight That They Can Explain Generalization." 36th Conference on Neural Information Processing Systems (NeurIPS 2022), 15 Pages.
Shai Shalev-Shwartz et al., Understanding Machine Learning: From Theory to Algorithms, 2014, 449 Pages.
Stephen H. Bach et al., "PromptSource: An Integrated Development Environment and Repository for Natural Language Prompts." Proceedings of the 60th Annual Meeting of the Association for Computational Linguistics System Demonstrations, pp. 93-104, May 22-27, 2022.
Teven Le Scao et al., "How Many Data Points is a Prompt Worth?" Proceedings of the 2021 Conference of the North American Chapter of the Association for Computational Linguistics: Human Language Technologies, pp. 2627-2636 Jun. 6-11, 2021.
Tianyu Gao et al., "Making Pre-trained Language Models Better Few-shot Learners." Proceedings of the 59th Annual Meeting of the Association for Computational Linguistics and the 11th International Joint Conference on Natural Language Processing, pp. 3816-3830 Aug. 1-6, 2021.
Tom B. Brown et al., "Language Models are Few-Shot Learners." 34th Conference on Neural Information Processing Systems (NeurIPS 2020), Vancouver, Canada, 25 Pages.
V. N. Vapnik et al., "On the uniform convergence of relative frequencies of events to their probabilities." Theory of Probability and its applications 171, vol. XVI, No. 2, pp. 264-280.
Vapnik, "Principles of Risk Minimization for Learning Theory." NIPS 1991, pp. 831-838.
Vaishnavh Nagarajan et al., "Generalization in Deep Networks: The Role of Distance from Initialization." arXiv:1901.01672v2 [cs.LG] Jan. 13, 2019, 15 Pages.
Yoad Tewel et al., "ZeroCap: Zero-Shot Image-to-Text Generation for Visual-Semantic Arithmetic." arXiv:2111.14447v2 [cs.CV] Mar. 31, 2022, 28 Pages.
Vaishnavh Nagarajan et al., "Uniform convergence may be unable to explain generalization in deep learning." 33rd Conference on Neural Information Processing Systems (NeurIPS 2019), Vancouver, Canada, 12 Pages.
Xiang Lisa Li et al., "Prefix-Tuning: Optimizing Continuous Prompts for Generation." Proceedings of the 59th Annual Meeting of the Association for Computational Linguistics and the 11th International Joint Conference on Natural Language Processing, pp. 4582-4597.
Yiding Jiang et al., "Fantastic Generalization Measures and Where to Find Them." arXiv:1912.02178v1 [cs.LG] Dec. 4, 2019, 33 Pages.

\* cited by examiner

SYSTEM AND METHOD FOR PROMPT SEARCHING

TECHNICAL FIELD

The present disclosure relates to prompt engineering, including those that utilize a language model, such as a large language model (LLM).

BACKGROUND

Self-supervised vision-language models (VLMs) like a Contrastive Language-Image Pre-Training (CLIP) may create aligned image and text encoders via contrastive training. Unlike traditionally-trained classification networks, such alignment enables zero-shot image classification by prompting the text encoder with hand-crafted inputs like "a photo of { }" then predicting the target via the maximal inner product with the input image embedding. However, choosing effective prompts for zero-shot learning remains largely an ad-hoc process: some systems have added several prompts like "the cartoon { }" or "art of the { }" aiming to improve ImageNet-R performance and accuracy.

SUMMARY

A first illustrative embodiment illustrates computer-implemented method for tuning a pre-trained machine-learning network. The method includes receiving a plurality of input images including a plurality of pixels, generating a visual matrix utilizing the plurality of input images and an image encoder of the machine learning network, wherein the visual matrix includes a list of encoded images, receiving a plurality of text prompts, selecting a first one of the text prompts from the plurality of text prompts, sending the first one of the text prompts to a large language model (LLM) to generate a candidate list of tokens, wherein the candidate list of tokens is generated by selecting a subset from every token associated with the first one of the text prompts, wherein the subset includes highest-probable tokens associated with the first one of the text prompts, wherein the highest-probable tokens are calculated in response to output of the LLM, selecting one or more tokens from the candidate list, converting the one of the text prompts into updated text prompts via appending the one or more selected tokens associated to the plurality of text prompts, generating a text matrix utilizing both the updated text prompt that include one or more tokens and a text encoder of the machine learning network, wherein the text matrix includes a list of encoded visual descriptors that includes the updated text prompt with one or more tokens, multiplying the text matrix and the visual matrix to generate an image-text similarity matrix, wherein the image-text similarity matrix assigns a numerical value indicating similarities between each of encoded visual descriptors and each of the encoded images, wherein similarities are indicated by entries of the image-text similarity matrix having numerical values, utilizing the numerical values assigned at the image-text similarity matrix, determining a score associated with the image-text similarity matrix, and when the score falls below a threshold, repeating steps (vi-xi) for a second token for the first one of the text prompts, and when the score exceeds the threshold, adding the one or more tokens to the updated text prompts and repeating steps (iv-xi) for a remainder of each of the plurality of text prompts, and outputting a final token to the updated text prompt in response to identifying a highest score associated with the final token after evaluating each of the plurality of text prompts.

A second illustrative embodiment illustrates a system including a processor programmed to receive a plurality of input images, generate a visual matrix utilizing the plurality of input images and an image encoder of the machine learning network, wherein the visual matrix includes a list of encoded images, receive a plurality of text prompts, select a first one of the text prompts from the plurality of text prompts, send the first one of the text prompts to a large language model (LLM) to generate a candidate list of tokens, wherein the candidate list of tokens is generated by selecting a subset of tokens from every token associated with the first one of the text prompts, wherein the subset includes highest-probable tokens associated with the first one of the text prompts, wherein the highest-probable tokens are calculated in response to output of the LLM, select one or more tokens from the candidate list, convert the one of the text prompts into updated text prompts via appending the one or more selected tokens associated to the plurality of text prompts, generate a text matrix utilizing both the updated text prompt that include one or more tokens and a text encoder of the machine learning network, wherein the text matrix includes a list of encoded visual descriptors that includes the updated text prompt with one or more tokens, multiply the text matrix and the visual matrix to generate an image-text similarity matrix, wherein the image-text similarity matrix assigns a numerical value indicating similarities between each of encoded visual descriptors and each of the encoded images, wherein similarities are indicated by entries of the image-text similarity matrix having numerical values, utilizing the numerical values assigned at the image-text similarity matrix, determine a score associated with the image-text similarity matrix, when the score falls below a threshold, repeating certain steps for a second token for the first one of the text prompts, and when the score exceeds the threshold, adding the one or more tokens to the updated text prompts and repeating certain steps for a remainder of each of the plurality of text prompts, and output a final token to the updated text prompt in response to identifying a highest score associated with the final token after evaluating each of the plurality of text prompts.

A third illustrative embodiment illustrates a computer-implemented method that includes receiving a plurality of input images, generating a visual matrix utilizing the plurality of input images and an image encoder of the machine learning network, wherein the visual matrix includes a list of encoded images, receiving a plurality of text prompts, selecting a first one of the text prompts from the plurality of text prompts, sending the first one of the text prompts to a language model (LM) to generate a candidate list of tokens, where in the candidate list of tokens is a subset smaller than all of the tokens associated with the first one of the text prompts, selecting one or more tokens from the candidate list, converting the one of the text prompts into updated text prompts via appending the one or more selected tokens associated to the plurality of text prompts, generating a text matrix utilizing both the updated text prompt that include one or more tokens and a text encoder of the machine learning network, wherein the text matrix includes a list of encoded visual descriptors that includes the updated text prompt with one or more tokens, multiplying the text matrix and the visual matrix to generate an image-text similarity matrix, wherein the image-text similarity matrix assigns a numerical value indicating similarities between each of encoded visual descriptors and each of the encoded images, wherein similarities are indicated by entries of the image-text similarity matrix having numerical values, utilizing the numerical values assigned at the image-text similarity matrix, determining a score associated with the image-text similarity matrix, and when the score falls below a threshold, repeating certain steps for a second token for the first one of the text prompts, and when the score exceeds the threshold, adding the one or more tokens to the updated text prompts and repeating certain steps for a remainder of each of the plurality of text prompts.

DETAILED DESCRIPTION

Figure 1:
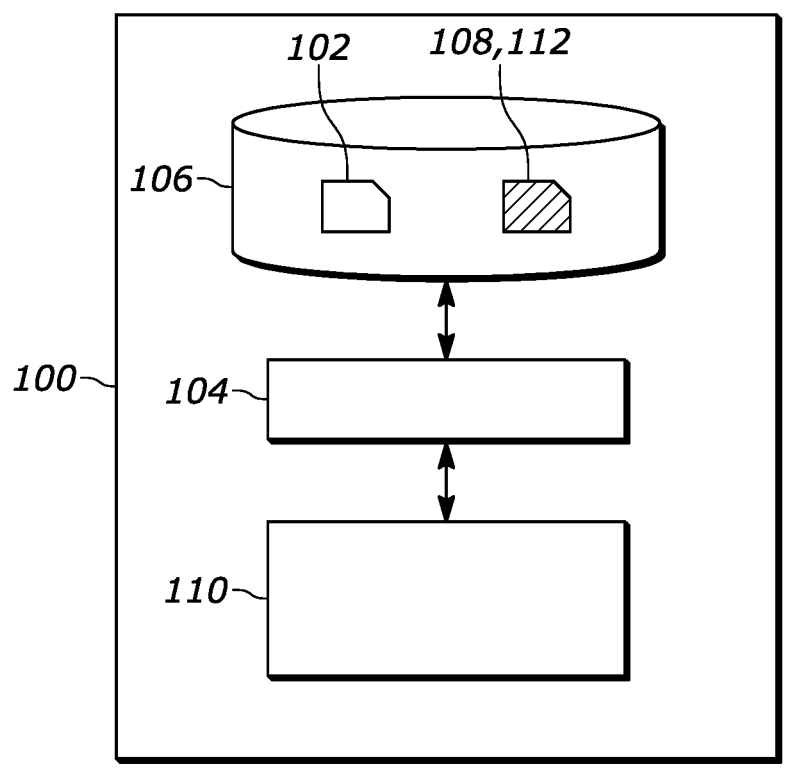
FIG. 1 shows a system for training a neural network, according to an embodiment.

Embodiments of the present disclosure are described Embodiments of the present disclosure are described herein. It is to be understood, however, that the disclosed embodiments are merely examples and other embodiments can take various and alternative forms. The figures are not necessarily to scale: some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Generalization bounds provide statistical guarantees on the average-case performance of the output of a learning algorithm. Traditional approaches for deriving generalization bounds are insufficient at explaining the generalization ability of deep learning, spurring a flurry of new approaches for deriving tighter generalization bounds for deep neural networks. In the recent literature on generalization bounds for neural networks, a large focus has been on developing data-dependent bounds, or bounds that take into consideration of the data distribution in addition to the hypothesis class. One of the best of such bounds are based on the PAC-Bayes framework and are derived by bounding the KL divergence between a well-informed prior and the posterior yielded by the learning algorithm. PAC-Bayes bounds have led to the first non-vacuous generalization bounds for deep learning, but they are still too loose to be practically useful. In fact, many of the novel PAC-Bayes bounds with data-dependent priors, while non-vacuous, can be best described as validation bounds—e.g., the use of data-dependent priors effectively leverages held-out data in a manner more akin to cross-validation, which renders them not directly comparable to pure training-performance bounds. Fundamentally, it may simply be the case that using an isotropic Gaussian over a large parameter space has fundamental limitations for reasoning about generalization in deep learning. Nonetheless, despite the lack of a clear theoretical basis, modern machine learning models are becoming increasingly large. Indeed, large pretrained models are becoming a mainstay in the design of modern machine learning models. One paradigm is to use these pretrained models such as CLIP or ALIGN as feature extractors and provide weak supervision for a downstream target task via prompts, which are text descriptions of the desired tasks that are often significantly easier to obtain compared to full model weights or even a generic linear classifier over the last layer. The versatility and performance of prompting pretrained models have led to the rise of prompt engineering, an emergent paradigm in machine learning where the users carefully design the task specification in text or even learn the prompts in a data-driven fashion. Despite its empirical success, little is understood of how and why prompting these pretrained models work, and in particular why the method seems to suffer little from overfitting: manually tuning or even greedily optimizing prompts on a given training set often performs nearly as well on the corresponding test set.

In one embodiment, a system and method may show that traditional PAC-Bayes bounds, when applied to the discrete hypothesis class defined by prompts (and specifically with a prior given by a large language model), are often remarkably tight, even for large-scale domains: for example, may achieve an generalization bound of 31% error for a full ImageNet classifier, which is within 6% of the actual observed test error. This represents a vast improvement over traditional deep-learning-based bounds, where achieving any non-vacuous bound on domains like ImageNet typically requires a great deal of effort: see, for instance, Table 1 for a comparison of our bounds with other approaches, especially the variants that do not use data-dependent priors (as our prompt-based bounds do not). To summarize, the system may find that unlike conventional deep learning models, prompting pretrained models does not suffer from the issues surrounding generalization bounds, and one can readily derive a strong theoretical guarantee for using prompts via well-studied techniques. Overall, these findings suggest that, despite the large amount of automatic or manual tuning, prompt engineering is potentially a principled approach for using these pretrained models that does not suffer the same lack of theoretical grounding as conventional deep learning models.

In this disclosure, a system and method may demonstrate that rather simple analysis tools in fact capture this behavior surprisingly well. In particular, the system may show that traditional PAC-Bayes bounds, when applied to the discrete hypothesis class defined by prompts (and specifically with a prior given by a large language model), are often remarkably tight, even for large-scale domains: for example, the system may achieve an generalization bound of 31% error for a full ImageNet classifier, which is within 6% of the actual observed test error. This represents a vast improvement over traditional deep-learning-based bounds, where achieving any non-vacuous bound on domains like ImageNet typically requires a great deal of effort: see, for instance, Table 1 for a comparison of our bounds with other approaches, especially the variants that do not use data-dependent priors (as our prompt-based bounds do not). To summarize, unlike conventional deep learning models, prompting pretrained models does not suffer from the issues surrounding generalization bounds, and one can readily derive a strong theoretical guarantee for using prompts via well-studied techniques. Overall, these findings suggest that, despite the large amount of automatic or manual tuning, prompt engineering is potentially a principled approach for using these pretrained models that does not suffer the same lack of theoretical grounding as conventional deep learning models.

With the advent of large pretrained models, prompting developed as a surprising yet effective method to harness the abilities of these large models with limited labeled data. The flexibility of prompting has enabled a wide range of new capabilities unavailable to previous machine learning models, leading to a significant effort to document successful prompting methods in both classification and text-to-image generation. As many of these methods may seem heuristic or over-engineered, methods have been proposed to learn "optimal" prompts given labeled data, which empirically performs well and is parameter efficient. One drawback to such data-driven approaches is that they learn "soft" prompts or embedding vectors that are not interpretable and, thus, do not exhibit great generalization properties. As such, existing methods have proposed gradient-based methods to learn interpretable prompts.

Prompt engineering has been extended to computer vision through CLIP (Contrastive Language-Image Pre-Training). CLIP employs a neural network architecture combining natural language processing and computer vision to comprehend images and their corresponding text descriptions. It undergoes pre-training using a vast dataset of image and text pairs with a contrastive learning objective, enabling the model to differentiate between diverse image and text combinations.

This broad training allows CLIP to grasp various concepts and relationships between images and language. Unlike traditional computer vision models that rely on fixed labels for image classification, CLIP can perform multiple tasks based on natural language instructions. Examples include object recognition, image caption generation, and zero-shot image classification using textual descriptions even for unseen labels.

Generalization bounds may be upperbounds on the generalization gap of a model. Deriving such bounds for deep learning has been difficult, and most are usually vacuous. They also may suffer from fundamental limitations. The core component of a generalization bound is a complexity measure, a quantity that relates to some aspect of generalization. A complexity measure may depend on the properties of the trained model, optimizer, and possibly training data, as long as it does not have access to a validation set. The most classic bounds such as VCdimension are often related to some form of parameter counting which is often too pessimistic for deep neural networks. Norm-based bounds usually rely on the margin and some norms of the model weights, but these bounds have been ineffective at studying generalization of deep learning. Another main class is the PAC-Bayes bounds which have been much more successful in deep learning due to the flexibility of prior although these bounds are still much looser than the actual generalization error. In one approach, the system may belong to the PAC-Bayes family, but the system may apply the PAC-Bayes bounds to the distribution of discrete tokens rather than the parameter of the neural networks with a language model as the prior. This may allow the system to derive significantly tighter bounds compared to applying the PAC-Bayes bounds that use less informed priors.

Reference is now made to the embodiments illustrated in the Figures, which can apply these teachings to a machine learning model or neural network. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train a pre-trained machine learning network that utilizes few-shot image learning described herein. Additional structure for operating and training the machine-learning models is shown in FIG. 2.

Figure 2:
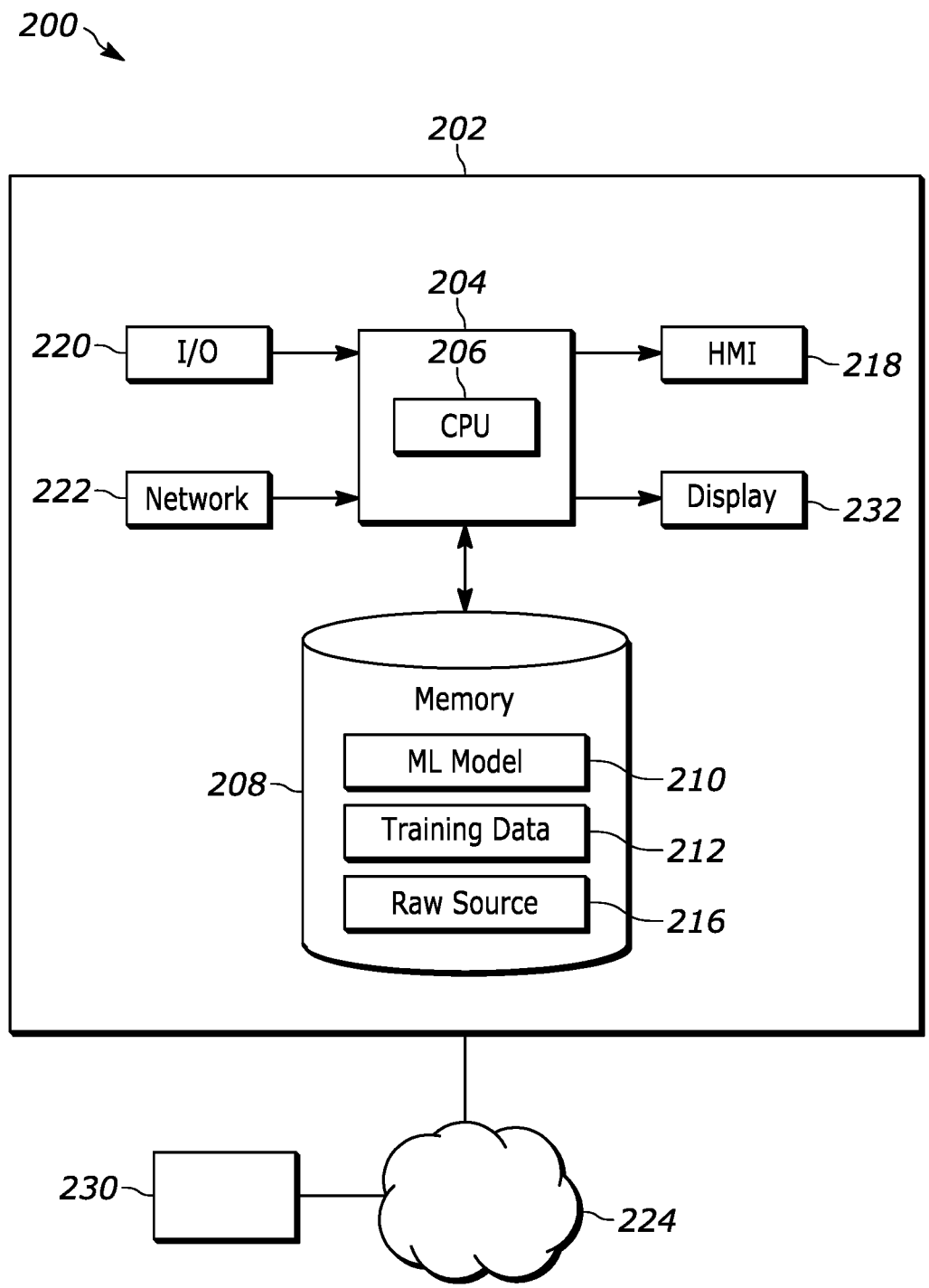
FIG. 2 shows a computer-implemented method for training and utilizing a neural network, according to an embodiment.

FIG. 2 depicts a system to implement the machine-learning models described herein, for example the pre-trained machine learning network that utilizes few-shot image learning described herein. The system 200 can be implemented to perform few-shot image learning described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The processor may include a controller, tensor processing unit, graphics processing unit, ASIC, FPGA, etc. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuity or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface).

The computing system 202 may include a human-machine interface (HMI) device 218 that may include any device that enables the system to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate the pre-trained machine learning network that utilizes few-shot image learning described herein.

The computer system may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a road sign in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., road sign). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In an example, the raw source data 216 may include image data representing an image. Applying the machine-learning algorithms (e.g., few-shot image learning, CLIP models, etc.) described herein, the output can be a tuned network associated with a set of images.

Figure 3:
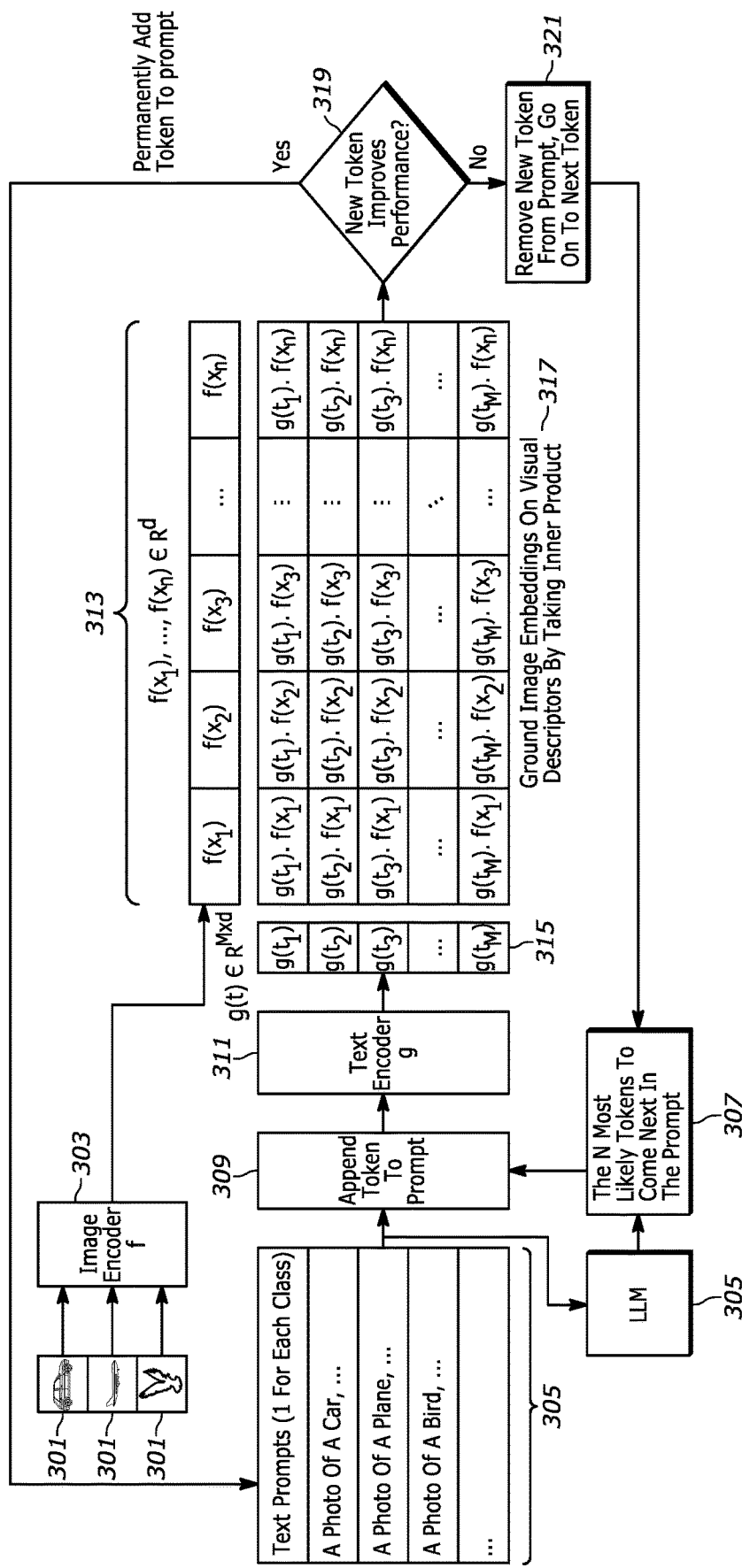
FIG. 3 illustrates a block diagram according to an embodiment of machine learning network utilizing a prompt searching.

FIG. 3 illustrates an overview of a diagram including prompt engineering. Let $\chi \in \mathbb{R}^d$ be a set of inputs and y=[K] be a label set, and there exists a probability distribution D on (X×Y) which is unknown. Let our data $(X_1, Y_1), \ldots, (X_n, Y_n)$ be drawn independent and identically drawn distributed random variables from D, and consider a predictor f: X→Y and a fixed set of predictors indexed by the parameter set $\Theta$. The description may use $f_\theta$ to denote the classifier indexed by $\theta$. The description may consider the 0-1 loss given by $\ell(y', y)=1\{y \neq y'\}$. The generalization error (risk) of a predictor may defined as $R(\theta)=\mathbb{E}_{(X,Y) \sim P}[\ell(f_\theta(X), Y)]$ and the empirical risk $$r(\theta) = \frac{1}{n}\sum_{i=1}^{n} \ell(f_\theta(X_i)),$$

satisfies $\mathbb{E}_S[r(\theta)]=R(\theta)$ for a sample $S=[(X_1, Y_1), \ldots, (X_n, Y_n)]$. An estimator is a function $\hat{\theta}: \cup_{n=1}^{\infty}(X \times Y)^n \to \Theta$.

CLIP consists of two encoders $f_{img}$ and $f_{txt}$. One or more images 301 may be sent to the image encoder 303 as input to the image encoder. Text prompts 302 may be utilized in a text encoder 311. Given an image $X \in \chi$, the image encoder $f_{img}: \chi \to \mathbb{R}^d$ maps an image X to a d-dimension real-valued embedding. Given a text $Z \in \mathcal{Z}$, the image encoder $f_{txt}: \mathcal{Z} \to \mathbb{R}^d$ maps a sentence Z to a d-dimension real-valued embedding. The text matrix 313 may be output by the image encoder. Given a batch of images $\{X_i\}_{i=1}^B$ and their corresponding texts $\{Z_i\}_{i=1}^B$, the training objective maximizes the cosine similarity of the embeddings of the matching image and text pair and minimize the cosine similarity of image and text pairs that do not correspond to each other. A primary task to consider is image classification via pre-trained vision-language models using natural language prompts by finding a class prompt, $\theta^k$, for each class. For a K-class classification problem with $\theta=(\theta^1, \theta^2, \ldots, \theta^K) \in \Theta = \mathcal{Z}^K$, the zero-shot classifier using CLIP is:

$$f_\theta(X) = \underset{k \in K}{\operatorname{argmax}}\langle f_{txt}(\theta^k), f_{img}(X)\rangle$$

As discussed, the system often are interested in the generalization ability of a predictor and the system may quantify this by upper bounds on the population loss (true risk). In general, the system may be concerned with the generalization gap which is the difference between the true risk and the empirical risk. Various generalization bounds can depend on the implicit bias of the learning algorithm, the training data S, or the data-generating distribution D. Classic VC bounds may not depend on either. Distribution-dependent bounds are expressed in terms of quantities related to the data-generating distribution while data-dependent bounds are expressed in terms of empirical quantities that can be computed directly from data and can be used for self-certification.

The PAC-Bayes framework defines a hierarchy over hypotheses in our hypothesis class $\Theta$ that takes the form of a prior distribution P over $\Theta$. That is, the system may assign a probability $P(\theta) \geq 0$ for each $\theta \in \Theta$ and refer to P ($\theta$) as the prior score of $\theta$. The learning process defines a posterior probability over $\Theta$ which may be denoted by Q. In the context of supervised learning, the system can think of Q as defining a prediction rule as follows: Given an instance X, the system may randomly pick a hypothesis $\theta$ according to Q and predict $f_\theta(X)$. Remarkably, it was shown that the generalization gap can be upper bounded by the KL-divergence between P and Q.

In one embodiment, a prompt may be analogous to finding a set of weights in regular machine learning models, where the hypothesis space is the space of texts/tokens. The goal is to find prompts that maximize the training accuracy without finetuning the parameters of the model. This process can be formulated as a discrete optimization over the space of tokens, V. Suppose that the system may be looking for class prompts 302 of length L, then the system will be searching for K·L tokens over the space of $|V|^{K \cdot L}$. This search is exponential in the length of the prompt 302, which can be intractable for even small token spaces. To circumvent this problem, the system may generate the prompts 302 in a sequential manner; that is, the system may increment the prompts by picking the token that maximizes the arch criterion, J, on the training dataset from a set of candidate tokens, $\hat{V}$. The search criterion is the objective being optimized, and candidate tokens are permissible tokens that can be used to extend the current class prompts. At every step of the search, the system may keep the class prompts fixed except for all but one class. The prompt for each class k is a sequence of l<L tokens $v \in V$, $\theta_{\leq l}^k = (v_1, v_2, \ldots, v_l)$, and the next token for $\theta^k$ is obtained via:

$$v_l + 1 = \arg\max_{v \in \hat{V}(\theta)} J(v, \theta_{\leq l}^k, \theta^{-k}).$$

$\theta^{-k}$ denotes the class prompts for all classes except for the $k^{th}$ class. The pseudocode for this process is outlined in detail in Algorithm 1. Using $\|$ to denote concatenation, the simplest instantiation of search is a greedy search, where using:

$$\hat{V}_{greedy}(\theta) = V, J_{greedy}(v, \theta_{\leq l}^k, \theta^{-k}) = -r((\ldots, \theta^{k-1}, \theta_{\leq l}^k \| v, \theta^{k+1}, \ldots))$$

In other words, the system may always search over all the tokens in the inner loop to maximize the training accuracy. This simplest greedy search can be seen as an instantiation of empirical risk minimization (ERM) since one of its only objective is to minimize the training error.

There may drawbacks to this algorithm, one of which may be that the system may need to search over V exhaustively in the inner loop. This can be expensive since it consists of all the tokens the vision-language model uses (e.g., CLIP has about 50000 tokens). Instead, the system could search over only a subset of V. To reduce this search space, the system may use a language model 305 (LM or LLM) to induce a distribution over the next tokens conditioned on $\theta^k$ and only evaluate the tokens with high probabilities:

$$p_{next}(v_l + 1 \mid \theta_{\leq l}^k) = p_{LM}(v_l + 1 \mid \theta_{\leq l}^k = [v_0, v_1, \ldots, v_l])\|.$$

Since CLIP may trained with natural language supervision, it is likely that a reasonable next token can be captured by an LLM 305 (e.g. an autoregressive LM), which is trained to model the probability of the next token. The system may then take the top N candidates and evaluate the accuracy of these candidates at block 307. In one embodiment, the system may evaluate only the accuracy of the top N candidates. Conveniently, this can be seen as constraining the complexity of the prompt as the language model 305 provides a structured prior over the set of tokens. The system may observe that using a language model 305 to propose likely tokens incurs minimal performance loss, suggesting that language models indeed are good prior for searching for class prompts on image classification tasks. Furthermore, the system may use predefined strings to further constrain the space of hypothesis by starting with an initial prompt such as "This is an image of" instead of using an empty string. These provide additional structure to the generated prompts.

This procedure can be further augmented to optimize the PAC-Bayes bound via structural risk minimization (SRM) namely, the system may take the hypothesis complexity (e.g., KL-divergence) into account as it searches for the next token for each prompt.

Algorithm 1 may be shown below:
For l = 0, ..., L − 1:
1. ClassOrder ← randomly ordered set of classes
2. For k ∈ ClassOrder:
   a. Use the language model to calculate $p_{LM}$ ($v_{l+1}$ $|\theta_{\leq l}^k$) for each v in the vocabulary (that is, the probability that each token in the vocabulary follows the current text prompt $\theta_{\leq l}^k$, for class k)
   b. $\hat{V}(\theta) \leftarrow$ The top N most likely next tokens according to $p_{LM}$
   c. criteria ← −∞
   d. For v ∈ $\hat{V}(\theta)$:
     i. score ← accuracy of the CLIP prediction made when appending v to current class k prompt $\theta_{\leq l}^k$
     ii. Optional: score ← score + β $p_{LM}$ ($v_{l+1}$ $|\theta_{\leq l}^k$) (add the probability that the token v follows the text prompt $\theta_{\leq l}^k$, multiplied by a constant β, which is a hyperparameter)
     iii. If score > criteria: (then this is the best token seen in this loop so far, and the system should add it to the prompt)
       1. criteria ← score
       2. $\theta_{l+1}^k$ ← v
Return θ

Thus, when the LLM 305 generates a N most like list of tokens at step 307, the system may then append one of the tokens to a prompt at step 309. The updated prompt, which includes the new token, may be sent to the text encoder 311 to create a text matrix 315. An image-text similarity matrix 317 may be generated by multiplying text matrix 315 with the image matrix 313. The image-text similarity matrix 317 may include numerical values that are utilized to determine a score that is utilized for evaluation of the token (e.g., updated text prompt with the token). The system may determine if the score exceeds a certain criteria or threshold at decision 319. If the score associated with the token meets a criteria, or performs better than a previous token, it may be added to the prompt 302. If not, the token may be removed at the system may evaluate a new token at step 321. The system may evaluate a set of all tokens for an associated class of the prompts 302.

In principle, the system may use the KL-divergence directly in the objective optimization, but using the probability of the token as the proxy produces much more linguistically coherent prompts without sacrificing the quality of the solution. Once again, the system may execute this optimization in a sequential manner via Greedy:

$$\hat{V}_{LM}(\theta) = TopN(p_{next}(v_l+1 \mid \theta^k_{\leq l})), J_{LM}(v, \mid \theta^k_{\leq l}, \theta^{-k}) = -r((\ldots, \theta^{k-1},$$

$$\theta^k_{\leq l} \| v, \theta^{k+1}, \ldots)) + \beta p_{next}(v \mid \theta^k_{\leq l},$$

where β is a hyperparameter that controls the strength of the regularization and TopN(·) is the set of tokens with N highest values of $P_{next}(v_l+1|\theta^k_{\leq l}$. The number of tokens to search over is also a hyperparameter that can be adjusted according to the computational constraints. Such a type of search may be as regularized greedy.

As alluded to earlier, deriving generalization bound may be closely connected to assigning hypotheses prior probabilities (that is, before seeing the training data) of them being good hypothesis. One of the most naive approach may be to assign a uniform probability, $$\frac{1}{|\Theta|},$$

to each hypothesis. With a uniform prior, the system may have the well-known uniform convergence bound). For every δ>0, with probability 1−δ over the training set of size n, for any posterior θ∈Θ, the following holds $$R(\theta) \leq r(\theta) + \sqrt{\frac{\log|\Theta| + \log\left(\frac{1}{\delta}\right)}{2n}}$$

Since the space of all prompts may be discrete, for a single hypothesis ^θ, the system may have the following uniform convergence bounds for prompts that depend on the prompt length, number of classes, and the number of tokens:

$$R(\hat{\theta}) \leq r(\hat{\theta}) + \sqrt{\frac{LK \log|V| + \log\left(\frac{1}{\delta}\right)}{2n}}$$

However, not all prompts are equally likely to be correct. To obtain a tighter generalization guarantee on the learned Θ, the system may leverage a classical PAC-Bayes bound to derive an upper bound on the generalization error of the learned prompts. For every δ>0, prior P over Θ, with probability 1−δ over the training set of size n, for any posterior Q over Θ, the following holds:

$$\mathbb{E}_{\theta \sim Q}[R(\theta)] \leq \mathbb{E}_{\theta \sim Q}[r(\theta)] + \sqrt{\frac{D_{KL}(Q\|P) + \log\left(\frac{n}{\delta}\right) + 2}{2n-1}}$$

In conventional deep learning, P and Q are often chosen to be isotropic Gaussian distributions so the KL-divergence between the prior and posterior can be easily computed. The system and method may use a language model as the prior over K independent prompts, $P(\theta)=\Pi_{i=1}^{K}\Pi_{j=1}^{L} p_{LM}(\theta_j^i|\theta_{<j}^i)$. Further, the system may treat the prompts θ found through search or through prompt engineering as a point $Q(\theta) = \mathbb{1}\{\theta=\hat{\theta}\}=\Pi_{i=1}^{K}\Pi_{j=1}^{L} \mathbb{1}\{\theta_j^i=\hat{\theta}_j^i\}$. In this case, the KL-divergence is conveniently equal to the negative log-likelihood of $\hat{\theta}$ under the language model because the posterior is zero everywhere except for at $\hat{\theta}$:

$$D_{KL}(Q\|P) = \sum_{\theta \in \Theta} Q(\theta) \log \frac{Q(\theta)}{P(\theta)} = \log \frac{1}{P(\hat{\theta})} =$$

$$-\sum_{i=1}^{K}\sum_{j=1}^{L} \log p_{LM}(\hat{\theta}_j^i \mid \hat{\theta}_{\leq j}^i)$$

This bound may provide an intuitive interpretation, which is that the generalizing prompts are the ones that achieve good training performance and are likely under the language model. Having a pointmass posterior over discrete space that the system can derandomize the PAC-Bayes bound for free. Combining these observations, the following deterministic upper bound on the generalization error may be used:

$$R(\hat{\theta}) \leq r(\hat{\theta}) + \sqrt{\frac{\sum_{i=1}^{K}\sum_{j=1}^{L} \log p_{LM}(\hat{\theta}_j^i \mid \hat{\theta}_{\leq j}^i) + \log\left(\frac{n}{\delta}\right) + 2}{2n-1}}$$

The system may refer to the RHS of the inequality as PB($\hat{\theta}$).

Figure 4:
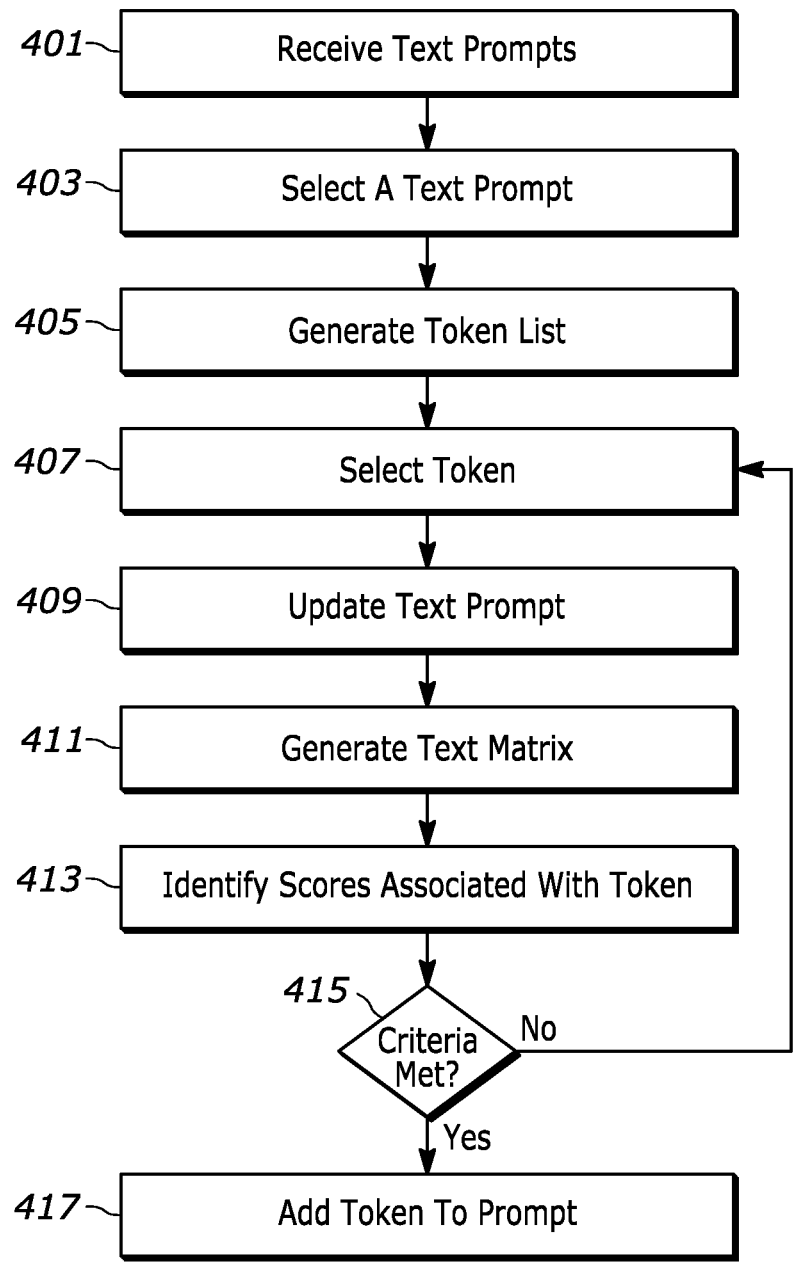
FIG. 4 illustrates a flow chart of an embodiment utilizing prompt searching.

FIG. 4 illustrates a flow chart according to an embodiment of the disclosure. The machine learning network may include a CLIP model that has a text encoder and an image encoder. The network may receive one or more text prompts at step 401. The text prompts may be associated with a class. The model may select a text prompt to be utilized at the network at step 403. The system may generate a token list that is associated with the select text prompt at step 403. The token list may be a list of words or string of words that may be associated with the class of the text prompts. At step 405, the system may send one of the text prompts to a language model (such as a large language model (LLM)) to generate a candidate list of tokens. The candidate list of tokens may generated by selecting a subset from every token associated with the first one of the text prompts. Thus, the subset will be smaller than every token available. As discussed, above the subset may include the highest-probable tokens associated with the first one of the text prompts. The highest-probable tokens may be calculated utilizing the language model or output of the language model, such as an LLM. At step 407, the system may select one or more tokens from the candidate list. The tokens may be randomly selected or selected via any method, as discussed above. At step 409, the system may update or convert one of the text prompts into updated text prompts via appending the one or more selected tokens associated to the plurality of text prompts. Thus, a token, for example "door," may be added to the text prompt "A vehicle has a." Utilizing the updated text prompt, the system may generate a text matrix at step 411. The system may utilize both the updated text prompt and the text encoder of the network to generate the text matrix. The text matrix may include a list of encoded visual descriptors that includes the updated text prompt with one or more tokens. At step 413, the system may identify a score associated with the token. The score may be calculated or determined based on an image-text similarity matrix that is created utilizing the text matrix and an image matrix. The system may multiply the text matrix and the visual matrix to generate an image-text similarity matrix. The image-text similarity matrix may assign a numerical value indicating similarities between each of encoded visual descriptors and each of the encoded images. The similarities may be indicated by entries of the image-text similarity matrix having a numerical value. At decision 415, the system may determine whether the criteria was met for a score. If the score falls below a threshold, the system may continue to evaluate other tokens until a sufficient score is met. When the score exceeds the threshold, the system may add the one or more tokens to the updated text prompts and continue to evaluate the remainder of each of the plurality of text prompts. The criteria threshold may be a certain score (e.g. a threshold score, a score from a previous prompt and token, etc.), a number of iterations, a convergence threshold (e.g. based upon a loss function algorithm, etc.), etc. Upon adding the token to the updated text prompt, the system may continue to evaluate the other text prompts associated with the prompt of that list by selecting other tokens and comparing them. If a token with a higher score is found, it may replace a previous text prompt (with the lower-score token). When all tokens have been evaluated, the system may output a final token to the updated text prompt when the system identifies a highest score associated with the final token after evaluating each of the plurality of text prompts. The final token that is utilized may include the best score out of all the tokens as related to the text prompt. The system may run the evaluation until all text prompts of the candidate list are evaluated.

Figure 5:
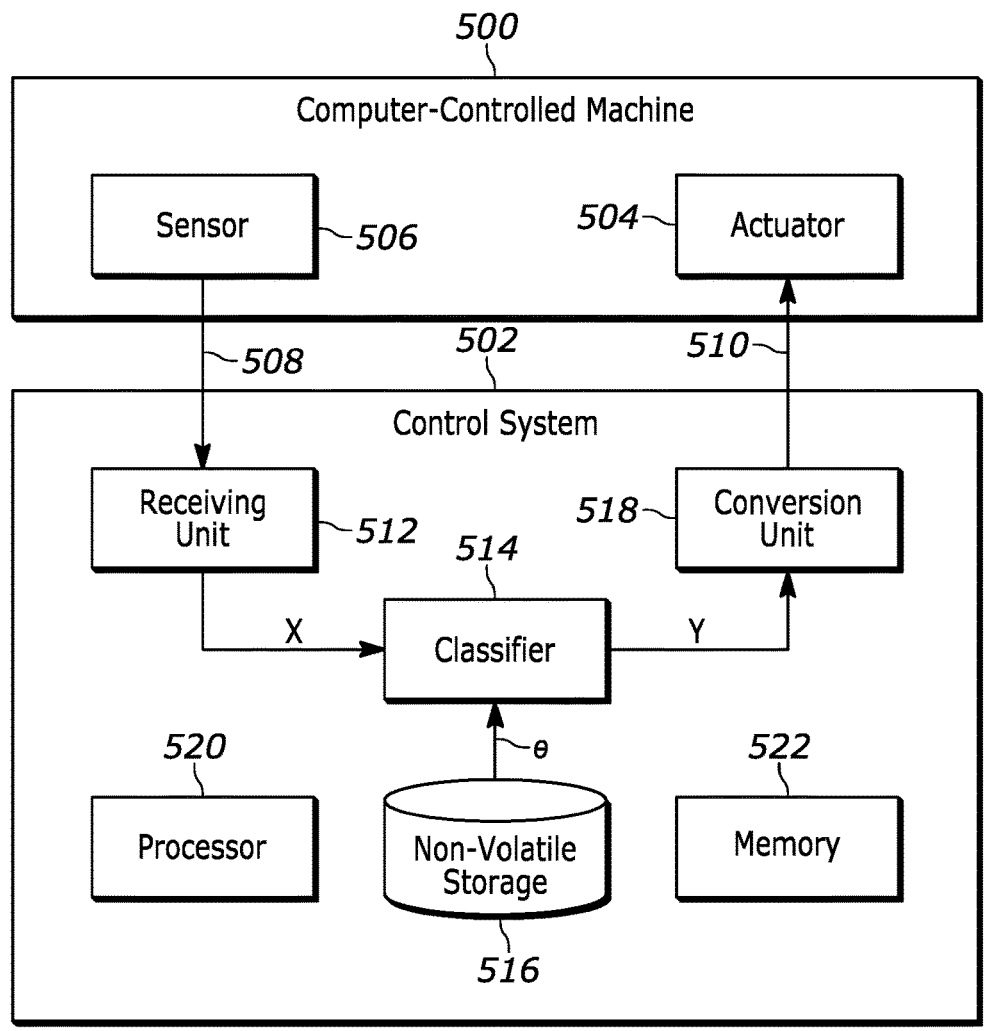
FIG. 5 depicts a schematic diagram of an interaction between a computer-controlled machine and a control system, according to an embodiment.

FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. Image data may be retrieved from these sensors, such as video images, picture images, radar images, sound images, etc. The images may represent video or picture data that may include a plurality of pixels that form a scene. A pixel may be the smallest addressable element in a raster image, or the smallest addressable element in a dot matrix display device. In most digital display devices, pixels may be the smallest element that can be manipulated through software. Each pixel may be a sample of an original or synthetic image. In one embodiment, more samples typically provide more accurate representations of the original. The intensity of each pixel may be variable. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter $\theta$). Parameters $\theta$ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to the image encoder or text encoder) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
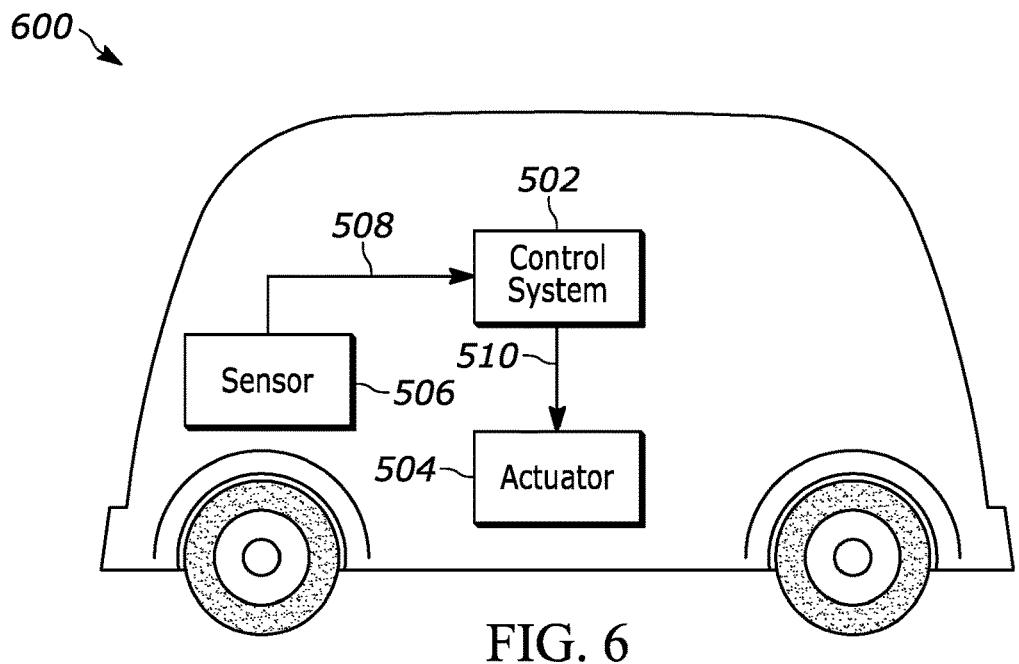
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a classification of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
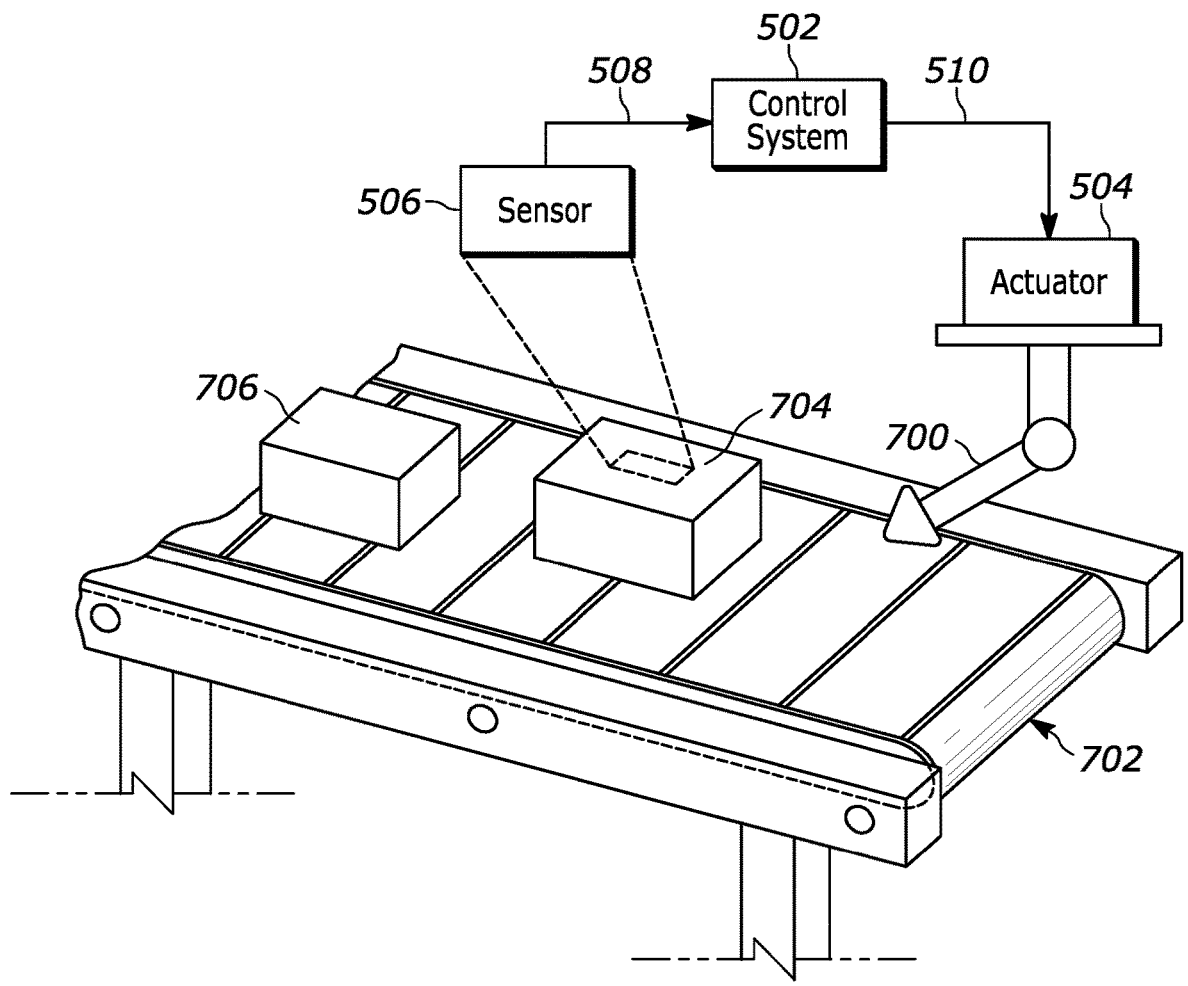
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
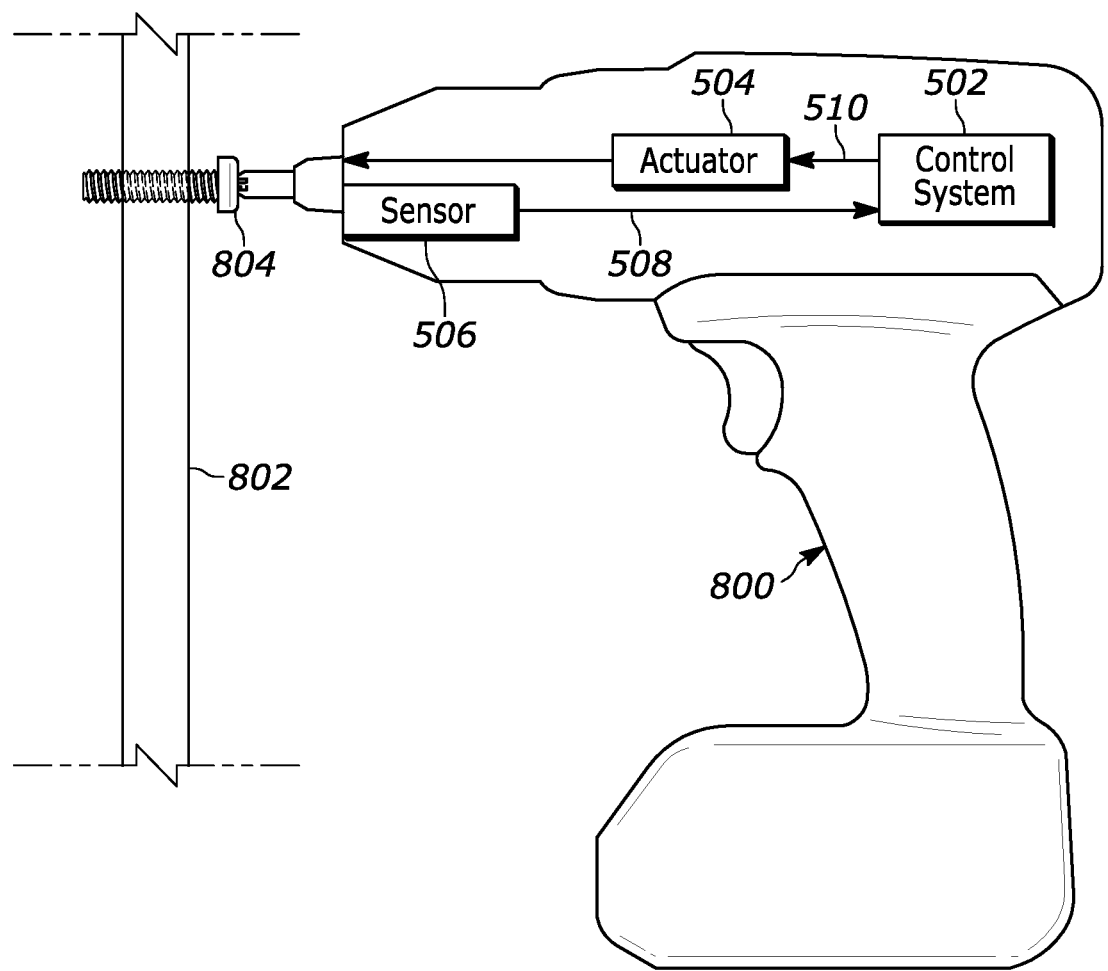
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
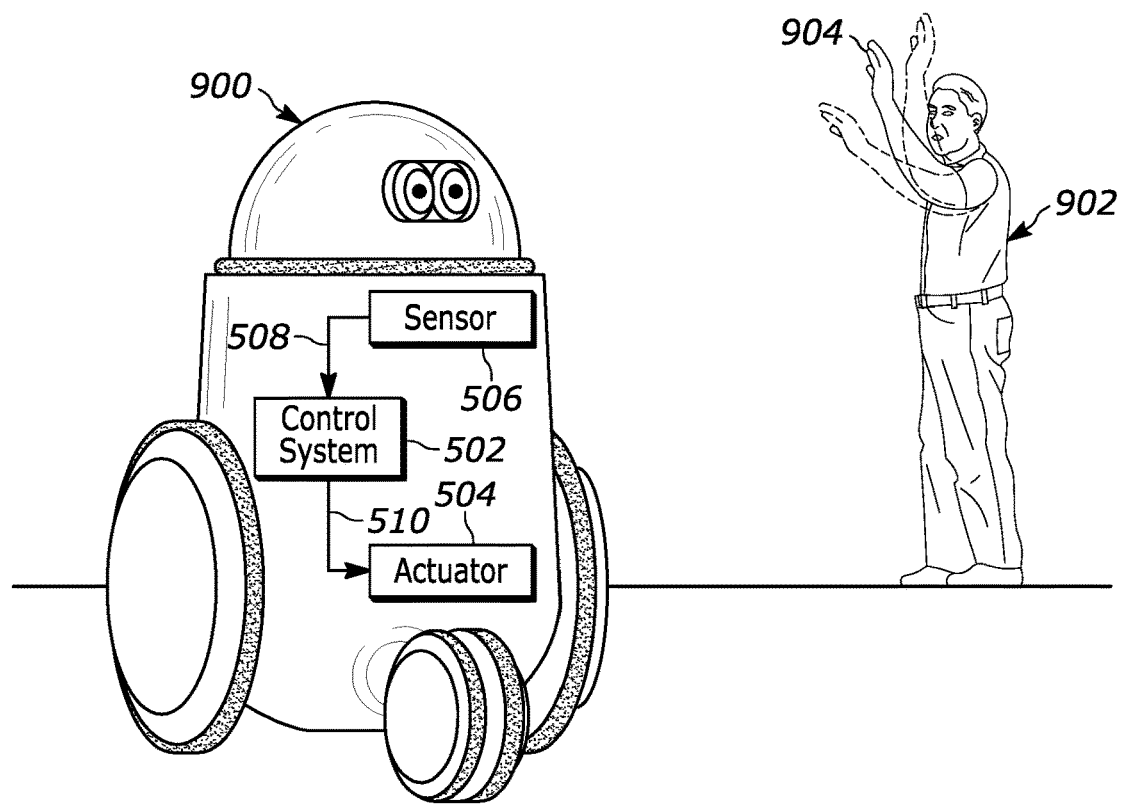
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
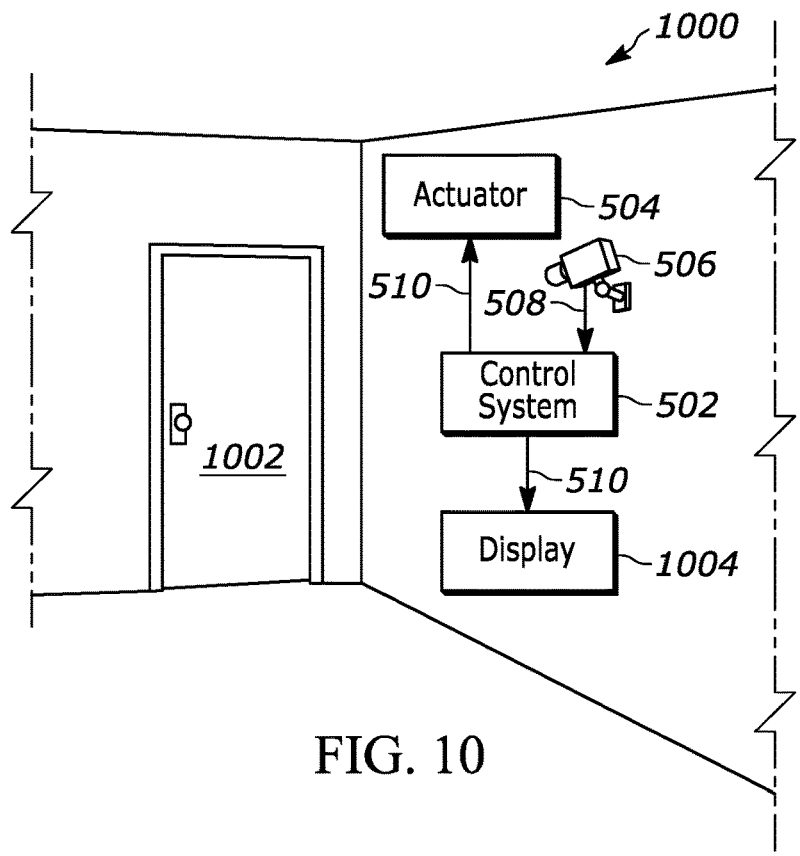
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may identify such objects and assign a class or descriptor to them.

Figure 11:
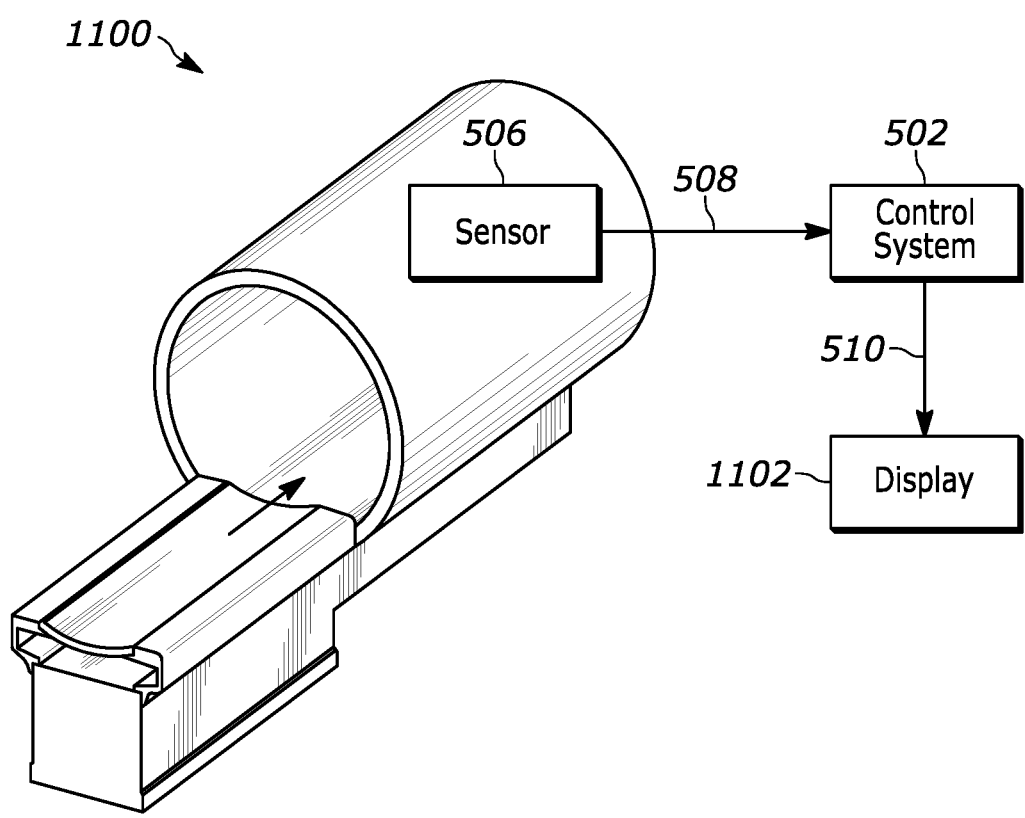
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous and assign a class or descriptor to the sensed image. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for a pre-trained machine-learning network, the computer-implemented method comprising the following steps:
   (i) receiving a plurality of input images including a plurality of pixels;
   (ii) generating a visual matrix utilizing the plurality of input images and an image encoder of the machine learning network, wherein the visual matrix includes a list of encoded images;
   (iii) receiving a plurality of text prompts;
   (iv) selecting a first one of the text prompts from the plurality of text prompts;
   (v) send the first one of the text prompts to a large language model (LLM) to generate a candidate list of tokens, wherein the candidate list of tokens is generated by selecting a subset from every token associated with the first one of the text prompts, wherein the subset includes highest-probable tokens associated with the first one of the text prompts, wherein the highest-probable tokens are calculated in response to output of the LLM;
   (vi) selecting one or more tokens from the candidate list;
   (vii) converting the one of the text prompts into updated text prompts via appending the one or more selected tokens associated to the plurality of text prompts;
   (viii) generating a text matrix utilizing both (1) the updated text prompt that include one or more tokens and (2) a text encoder of the machine learning network, wherein the text matrix includes a list of encoded visual descriptors that includes the updated text prompt with one or more tokens;
   (ix) multiplying the text matrix and the visual matrix to generate an image-text similarity matrix, wherein the image-text similarity matrix assigns a numerical value indicating similarities between each of encoded visual descriptors and each of the encoded images, wherein similarities are indicated by entries of the image-text similarity matrix having numerical values;
   (x) utilizing the numerical values assigned at the image-text similarity matrix, determining a score associated with the image-text similarity matrix; and
   (xi) when the score falls below a threshold, repeating steps (vi-xi) for a second token for the first one of the text prompts, and when the score exceeds the threshold, adding the one or more tokens to the updated text prompts and repeating steps (iv-xi) for a remainder of each of the plurality of text prompts; and
   (xii) outputting a final token to the updated text prompt in response to identifying a highest score associated with the final token after evaluating each of the plurality of text prompts.

2. The method of claim 1, wherein determining a score associated with the image-text similarity matrix includes utilizing KL-divergence.

3. The method of claim 1, wherein the image-text similarity matrix is a matrix of one-hot encodings of each image.

4. The method of claim 1, wherein the text encoder is a contrastive language-image pre-training (CLIP) text encoder and the image encoder is a CLIP image encoder.

5. The method of claim 1, wherein parameters associated with the image encoder and text encoder are not modified.

6. The method of claim 1, wherein the threshold is a number of iterations.

7. The method of claim 1, wherein the threshold includes a length associated with the plurality of text prompts.

8. The method of claim 1, wherein the threshold is a convergence threshold.

9. The method of claim 1, wherein one of the text prompts is associated with a class representative of the one of the plurality of input images.

10. The method of claim 1, wherein the one or more tokens include a word.

11. A system, comprising:
   a processor programmed to:
   (i) receive a plurality of input images indicative of radar, sonar, video, picture, sound, or LiDar information;
   (ii) generate a visual matrix utilizing the plurality of input images and an image encoder of the machine learning network, wherein the visual matrix includes a list of encoded images;
   (iii) receive a plurality of text prompts;
   (iv) select a first one of the text prompts from the plurality of text prompts;
   (v) send the first one of the text prompts to a large language model (LLM) to generate a candidate list of tokens, wherein the candidate list of tokens is generated by selecting a subset of tokens from every token associated with the first one of the text prompts, wherein the subset includes highest-probable tokens associated with the first one of the text prompts, wherein the highest-probable tokens are calculated in response to output of the LLM;
   (vi) select one or more tokens from the candidate list;
   (vii) convert the one of the text prompts into updated text prompts via appending the one or more selected tokens associated to the plurality of text prompts;
   (viii) generate a text matrix utilizing both (1) the updated text prompt that include one or more tokens and (2) a text encoder of the machine learning network, wherein the text matrix includes a list of encoded visual descriptors that includes the updated text prompt with one or more tokens;
   (ix) multiply the text matrix and the visual matrix to generate an image-text similarity matrix, wherein the image-text similarity matrix assigns a numerical value indicating similarities between each of encoded visual descriptors and each of the encoded images, wherein similarities are indicated by entries of the image-text similarity matrix having numerical values;

(x) utilizing the numerical values assigned at the image-text similarity matrix, determine a score associated with the image-text similarity matrix;

(xi) when the score falls below a threshold, repeating steps (vi-xi) for a second token for the first one of the text prompts, and when the score exceeds the threshold, adding the one or more tokens to the updated text prompts and repeating steps (iv-xi) for a remainder of each of the plurality of text prompts; and (xii) output a final token to the updated text prompt in response to identifying a highest score associated with the final token after evaluating each of the plurality of text prompts.

12. The system of claim 11, wherein the one or more tokens include a word.

13. The system of claim 11, wherein adding the one or more tokens to the updated text prompts include replacing a previous token with a lower score.

14. The system of claim 11, wherein parameters associated with the image encoder and text encoder stay fixed.

15. A computer-implemented method, comprising:
(i) receiving a plurality of input images;
(ii) generating a visual matrix utilizing the plurality of input images and an image encoder of the machine learning network, wherein the visual matrix includes a list of encoded images;
(iii) receiving a plurality of text prompts;
(iv) selecting a first one of the text prompts from the plurality of text prompts;
(v) sending the first one of the text prompts to a language model (LM) to generate a candidate list of tokens, where in the candidate list of tokens is a subset smaller than all of the tokens associated with the first one of the text prompts;
(vi) selecting one or more tokens from the candidate list;
(vii) converting the one of the text prompts into updated text prompts via appending the one or more selected tokens associated to the plurality of text prompts;
(viii) generating a text matrix utilizing both (1) the updated text prompt that include one or more tokens and (2) a text encoder of the machine learning network, wherein the text matrix includes a list of encoded visual descriptors that includes the updated text prompt with one or more tokens;

(ix) multiplying the text matrix and the visual matrix to generate an image-text similarity matrix, wherein the image-text similarity matrix assigns a numerical value indicating similarities between each of encoded visual descriptors and each of the encoded images, wherein similarities are indicated by entries of the image-text similarity matrix having numerical values;

(x) utilizing the numerical values assigned at the image-text similarity matrix, determining a score associated with the image-text similarity matrix; and (xi) when the score falls below a threshold, repeating steps (vi-xi) for a second token for the first one of the text prompts, and when the score exceeds the threshold, adding the one or more tokens to the updated text prompts and repeating steps (iv-xi) for a remainder of each of the plurality of text prompts.

16. The method of claim 15, wherein adding the one or more tokens to the updated text prompts includes replaced a previous token.

17. The method of claim 15, wherein the candidate list of tokens is generated by selecting a subset of tokens from every token associated with the first one of the text prompts, wherein the subset includes highest-probable tokens associated with the first one of the text prompts, wherein the highest-probable tokens are calculated in response to output of the LLM.

18. The method of claim 15, wherein the method includes outputting a final token to the updated text prompt in response to identifying a highest score associated with the final token after evaluating each of the plurality of text prompts.

19. The method of claim 15, wherein the one or more tokens include a word.

20. The method of claim 15, wherein adding the one or more tokens to the updated text prompts include replacing a previous token with a lower score.

* * * * *